Figure 10:
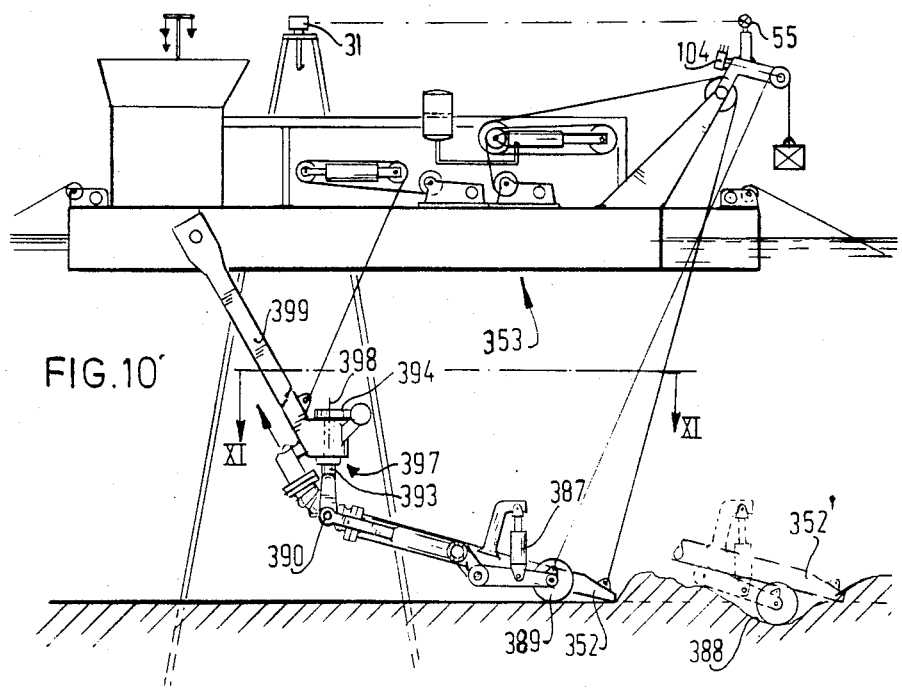

United States Patent [19]

Wolters et al.

[11] Patent Number: 4,584,784
[45] Date of Patent: Apr. 29, 1986

[54] METHOD AND DEVICE FOR MAINTAINING TOOLS AT A LEVEL

[76] Inventors: Tjako A. Wolters, No. 4, Sanatoriumlaan, Zeist; Cornelis J. Ravesteyn, 37, Herenweg, Wilnis; Thomas J. Ruyter, No. 3, Wulpenhof, Schagen, all of Netherlands

[21] Appl. No.: 320,063

[22] Filed: Nov. 10, 1981

Related U.S. Application Data

[63] Continuation of Ser. No. 79,303, Sep. 26, 1979, abandoned.

[30] Foreign Application Priority Data

Sep. 29, 1978 [EP] European Pat. Off. ............ 78200217

[51] Int. Cl.³ ............................................. E02F 3/88
[52] U.S. Cl. ........................................ 37/58; 37/72; 37/DIG. 1
[58] Field of Search ................. 37/DIG. 1, DIG. 19, 37/DIG. 20, 58, 55, 72

[56] References Cited

U.S. PATENT DOCUMENTS

| | | | |
|---|---|---|---|
| 371,686 | 10/1887 | Howell | 37/58 |
| 1,062,924 | 5/1913 | Mercer | 37/DIG. 19 |
| 2,204,584 | 6/1940 | Flower | 37/55 X |
| 2,461,311 | 2/1949 | Cushing et al. | 37/DIG. 19 |
| 3,046,681 | 7/1962 | Kutzler | 37/DIG. 20 |
| 3,226,854 | 1/1966 | Mero | 37/58 |
| 3,514,881 | 6/1970 | Hadjidakis | 37/58 |
| 3,826,023 | 7/1974 | Dekoning et al. | 37/58 |
| 3,887,012 | 6/1975 | Scholl et al. | 37/DIG. 20 |
| 3,890,840 | 6/1975 | Malloy | 73/290 V |

FOREIGN PATENT DOCUMENTS

| | | | |
|---|---|---|---|
| 558047 | 8/1932 | Fed. Rep. of Germany | 37/58 |
| 2413738 | 10/1974 | Fed. Rep. of Germany | 37/66 |
| 1056632 | 1/1967 | United Kingdom | 37/63 |
| 1173442 | 12/1969 | United Kingdom | 37/DIG. 1 |
| 1277401 | 6/1972 | United Kingdom | 37/58 |

OTHER PUBLICATIONS

Oostrum, "Geprogrammeerdbaggeren", *DeIngenieur*, vol. 87, No. 27, 7/1975, pp. 545–557.

*Primary Examiner*—Clifford D. Crowder
*Attorney, Agent, or Firm*—John P. Snyder

[57] ABSTRACT

A tool is controlled below a water surface by carrying out a level comparison between a level-fixed measuring element postioned on land and a level-varying measuring element belonging to the tool and by adjusting the level of the tool with respect to a floating body in dependence upon said comparison.

2 Claims, 12 Drawing Figures

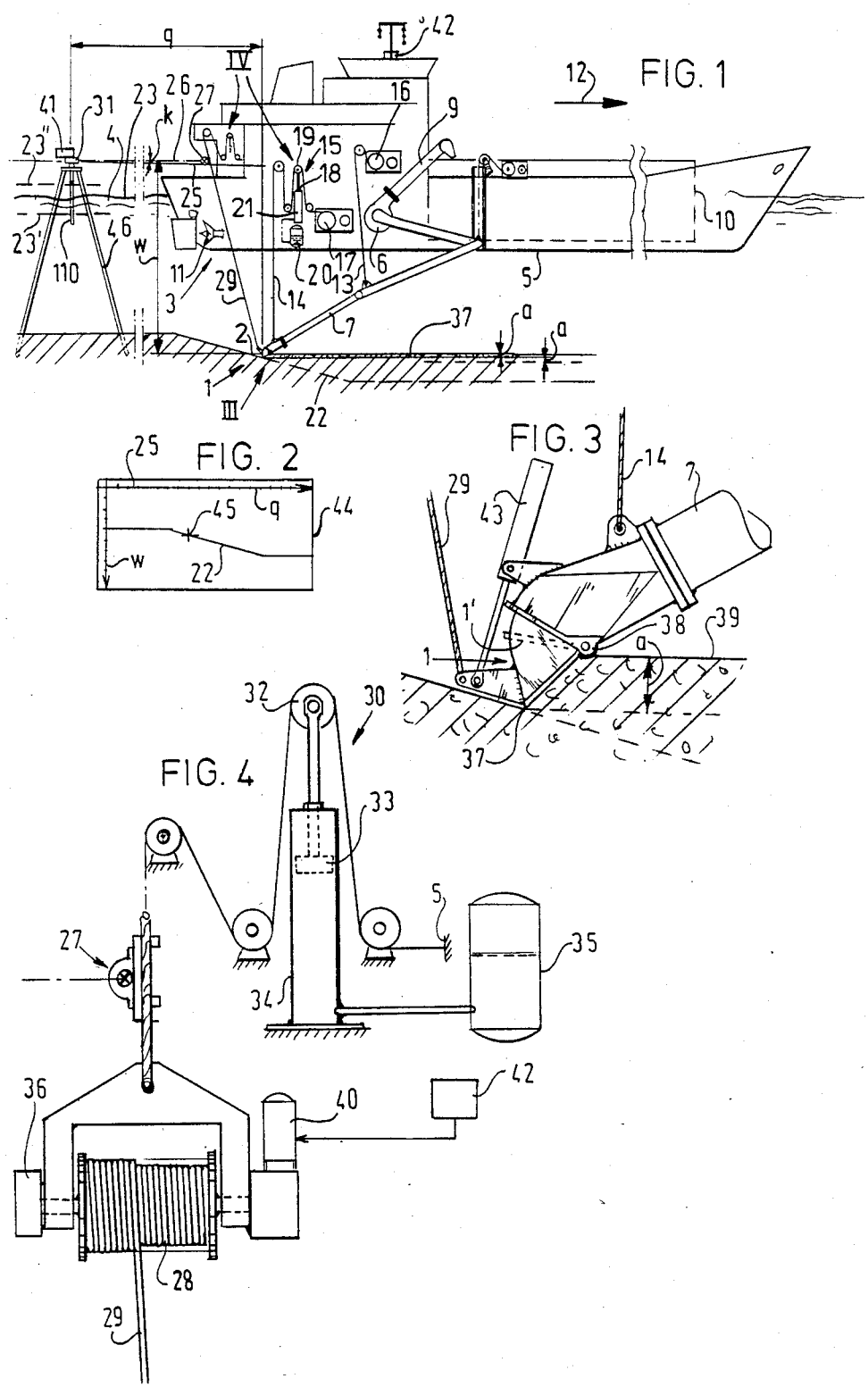

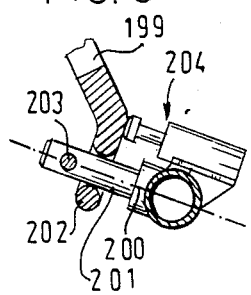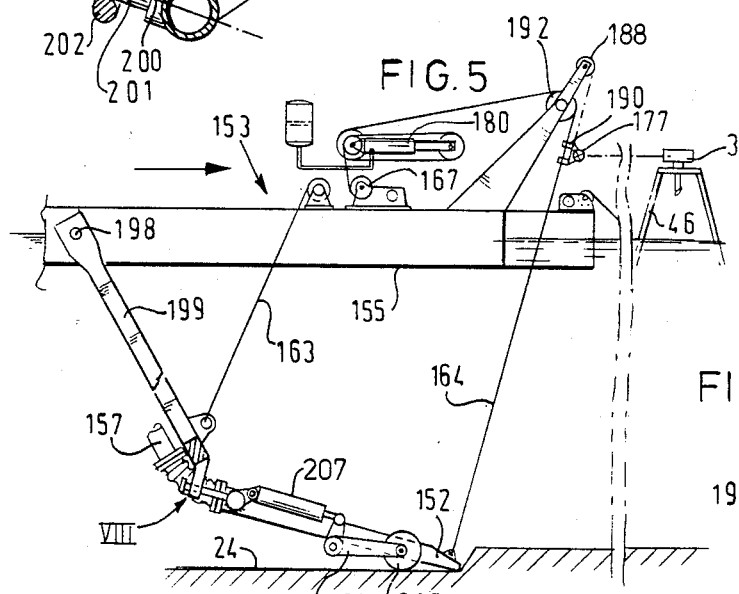

METHOD AND DEVICE FOR MAINTAINING TOOLS AT A LEVEL

CROSS REFERENCE TO RELATED APPLICATION

This application is a continuation of application Ser. No. 79,303, filed Sept. 26, 1979 and now abandoned.

The invention relates to a method of working a subaqueous ground by means of a tool working the subaqueous ground and connected through a cable with a floating body, said tool being controlled in dependence upon level measurement, at which level measurement a level comparison is carried out between a level-fixed measuring element positioned on land and a measuring element carried by the floating body.

Such a method is known from the article written by Ir. W. H. A. van Oostrum in the magazine "De Ingenieur", Vol. 87, no. 27, dated July 3, 1975, pages 545 to 557. In this known method the level of the floating body with respect to the level-fixed measuring element is determined, the depth of the tool with respect to the floating body is fixed by means of a measuring cable by measuring the length of the part delivered from a winch drum and the depth of the tool with respect to the earth is deduced from the two measuring values by a combination of these measuring values. In this known method in fact two measuring faults are made owing to the two measurements, which disadvantageously influence the accuracy of the control.

The invention has for its object to improve the accuracy of the known method. For this purpose a level comparison is made between the level-fixed measuring element and a level-varying measuring element coupled through a cable with the tool at a given level difference with respect to said tool. Owing to the direct reading of the measurement only one measuring value will suffice for determining the level of the tool. As a result only one measuring fault is made instead of two measuring faults.

The invention relates to and provides also a device for working a subaqueous ground, comprising a floating body, a tool working the subaqueous ground and connected by means of at least one cable with the floating body, a level-varying measuring element carried by the floating body, a level-fixed measuring element stationarily positioned on land, a comparator for measuring the level difference between these two measuring elements, and comprising adjusting means to be actuated in dependence upon the comparator for controlling the tool. This device is characterized in that the level-varying measuring element is coupled with the tool through a measuring cable partly wound on a winch.

An accurate and practical measurement is obtained when the level-varying measuring element is formed by a radiation source. The radiation source may be formed, for example, by a light source and particularly an infrared radiation source. The level phase difference can be readily measured when the level-fixed measuring element is formed by a goniometer measuring the angle between the radiation and the horizon.

The measuring cable can be safely held in the taut state when the level-varying measuring element is coupled on the one hand with the tool through a measuring cable and on the other hand through a cable-length varying member with the floating body.

The tool concerned may be the bottom end of the ladder of a dredger or another scraping tool. The invention is particularly suitable for a dragging dredger. In this case the tool is preferably formed by the rangefinder of the dragged head of a dragging dredger.

In the case of a propelling dredger the tool is formed by the suction nozzle of a propelling dredger bearing on the ground through a supporting member which is level-adjustable with respect to the suction nozzle.

In order to maintain a broad suction nozzle in a horizontal position, the suction nozzle is preferably conected through a hinge having a standing pivot and buffer means with a ladder pivoted to the floating body and/or the suction nozzle is suspended by means of a branched cable to the floating body and is arranged so as to be pivotable about a horizontal axis with respect to a ladder pivoted to the floating body.

It is noted that from U.S. Pat. No. 3,890,840 a method is known, in which a level comparison is made between a laser radiation source stationarily positioned on land and a series of photo-electric cells stationarily arranged with respect to the floating body.

From U.S. Pat. No. 3,046,681 a method of controlling a tool above the water surface is known, wherein the level of a measuring element is determined through a light source and a glass, said measuring element being connected with the tool and being lighted up by the ray of the light source. However, this measuring element is rigidly connected to the tool by means of a rigid rod.

British Patent Specification No. 1,277,401 describes a suction dredger provided with a goniometer for determining the position of the ladder and for thus determining the level difference between the tool and the floating body. The motions of the floating body in vertical sense with respect to earth should be yet determined in a second measurement in order to be able to calculate the level of the tool with respect to a stationary position on earth.

U.S. Pat. No. 3,826,023 describes a suction dredger known per se, wherein a tool, formed by a suction pipe and working the subaqueous ground is suspended to a floating body by means of a cable through a cable length variator. In this known suction dredger a non level-varying measuring element is connected with the cable, the level of which is compared with a level-fixed measuring element stationarily arranged on land.

From German Patent Specification No. 558,047 a suction dredger is known, a suction pipe of which being suspended to a floating body.

From British Patent Specification No. 1,056,632 a dragging dredger is known, the suction pipe of which being provided with a dragged head with an adjustable range-finder.

From British Patent Specification No. 1,173,442 a suction dredger is known, wherein the position of the floating body is determined by means of radio gauging in the horizontal plane with respect to two stationary radio buoys.

German laid open application No. 2,413,738 describes a suction dredger wherein the depth of the floating body with respect to the subaqueous ground is determined through echosounder gauging.

The invention will be described more fully hereinafter with reference to a drawing.

Figure 11:
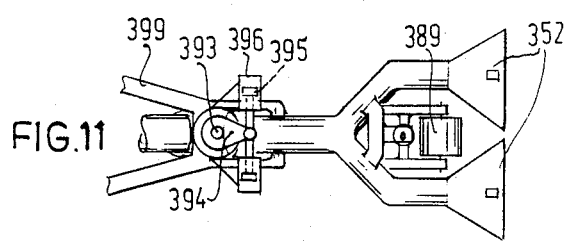

The drawing shows schematically in:

FIGS. 1, 5, 10 and 12 a side elevation of respectively different tools during the performance of the method in accordance with the invention, FIG. 2 a work diagram used in the method shown in FIG. 1, FIG. 3 the detail III of FIG. 1, FIG. 4 the detail IV of FIG. 1, FIG. 6 a front view of the device of FIG. 5, FIG. 7 a bottom view of the device of FIG. 5, FIG. 8 is an enlarged scale showing the detail of Section VIII of FIG. 5, FIG. 9 a variant of FIG. 7, and FIG. 11 an elevational view along the line XI—XI of the device of FIG. 10.

When carrying out the method illustrated in FIG. 1, a tool 1 formed by the range finder of a dragging suction nozzle 2 of a dragging dredger 3 is adjusted to a level below the water surface 4. The dragging dredger 3 comprises a floating body 5 in which a suction pump 6 is arranged for sucking up a suspension of soil 8 with water 4 through a flexible suction pipe 7 having the suction nozzle 2 at its lower end and for pumping the same through a pressure pipe 9 into a hold 10. The floating body 5 is propelled by driven screws 11 in the direction of the arrow 12, whilst the suction pipe 7 is carried by the floating body 5 on hoisting cables 13 and 14. The hoisting cable 13 extends towards a winch 16, whereas the hoisting cable 14 extends via a backwash compensator 15 to a winch 17. The backwash compensator 15 comprises a guide disc 19 adjustable in a direction of height and carried by a piston 18, which bears in a cylinder 21 on a hydro-pneumatic spring 20. By way of example, FIG. 1 illustrates the prescribed profile 22 to be assumed by the ground below the water 4. The water level 23 varies with ebb and flow, for example, between 23' and 23", whilst, in addition, the floating body 5 may move up and down with respect to the mean water level 23 under the action of the waves. During each working strip a layer of thickness a is dredged from the bottom 24. For an economic dredging operation it is advantageous to maintain this layer of thickness a constant. Therefore, starting from the profile 22 a layer of thickness a is removed each time. The localisation in a horizontal sense is performed in a manner known per se and not described herein.

At a distance from the ground 24 to be worked, a level-fixed measuring element 31 is disposed stationarily on land, for example, on a frame 46 standing on subaqueous ground, said element being formed, for example, by a goniometer measuring the angle k between the horizon 25 and a radiation 26 emanating from a radiation source. The radiation source constitutes a level-varying measuring element 27 constantly compared with the measuring element 31. On the one hand the level-varying element 27 is coupled with the tool 1 at a given level difference w with respect to said tool through a measuring cable 29 partly wound on a winch 28 and on the other hand it is coupled with the floating body 5 through a cable length varying element 30, a level-varying guide disc 32 of which is supported by a piston 33 of a cylinder 34, which is subjected to the elastic pressure of a hydro-pneumatic spring 35.

A human observer on the frame 46 constantly informs by radio about the measured angle k the controller of the dredging process on board the floating body 5 and this controller adjusts the tool 1 in accordance with the measured angle k, which is a measure for the assessed level difference between the two measuring elements 31 and 27. The length of the measuring cable 29 can be assessed by constructing the measuring cable in the form of a strong measuring tape, but this is effectively done by recording the number of engaging and disengaging revolutions and partial revolutions of the winch drum 28 on an indicator 36. If the range finder (tool 1) has to be set to a given, for example, new and lower level 37, the measuring element 27 is preferably set to the same level as the measuring element 31. The winch drum 28 is moved by means of a motor 40, whilst the hoisting cable 14 is paid out until a skid 38 bears on a bottom surface 39 previously formed.

When the tool 1 is thus positioned, it is located at the depth a below the surface 39. In order to maintain the tool 1 in the adjusted position despite tidal and wave movements, the winch drum 28 is adjusted at every assessed angle unequal to nil for paying out or retracting the measuring cable 29 until the angle k is again nil. This setting is preferably performed automatically, for example, by means of a radio transmitter 41 connected to the measuring element 31 and actuating the motor 40 through a receiver 42 provided on the floating body 5. As an alternative, the system may be such that the tool 1 is not adjusted by means of the measuring cable 29 and the motor 40 and that the motor 40 is replaced by a pawl driving gear (not shown), which retains the measuring cable 29 at a given length on the winch drum 28, whilst the setting of the tool 1 is hydraulically performed by remote control from the floating body 5 with the aid of a hydraulic cylinder 43. Preferably the control-panel of the dragging dredger 3 displays the depth of the tool 1 with respect to the measuring element 31 resulting from a calculation on the basis of the measured angle k and the length of the measuring cable 29 in the form of point 45 on a diagram 44 (FIG. 2) plotting on the co-ordinates the depth w of the tool 1 with respect to the level 25 of the measuring element 31 and the horizontal distance q of the tool 1 from the measuring element 31, the panel showing, in addition, the profile to be dredged.

If the skid 38 should drop into a pothole and there should be no need for sucking up earth from this place, the tool 1 is drawn upwards into the position 1' indicated in FIG. 3 by broken lines, as a result of which such an amount of water enters into the suction pipe 7 that no suction force for sucking up earth is left.

The propelling dredger 153 of FIG. 5 comprises a floating body 155, to which is suspended a ladder 199, which is pivotable about a horizontal shaft 198. The ladder 199 is furthermore suspended to the floating body 155 by means of a hoisting cable 163. A suction nozzle 152 consisting of two suction branches 197 each having a separate inlet 196 and a flexible length of conduit 195 communicates with a suction pipe 157 fastened to the ladder 199. This broad suction nozzle 152 is carried at the free end and maintained in a horizontal position by means of a branched cable 194, which is suspended to a hoisting cable 164 extending towards a winch 167 via a backwash compensator 180. The hoisting cable 164 with the branched cable 194 serves, in addition, as a measuring cable since an omnidirectionally radiating light source forming a level-variable measuring element 177 is fastened to the hoisting cable 164. A reversing disc 192 is coupled with a wire-length meter 191. When the suction nozzle 152 has to be displaced by a large level difference, for example, when it has to be hauled above the water level, the level-variable measuring element 177 is disengaged from the hoisting cable 164 by loosening a cable clamp 190 so that the measuring element 177 will hang on cables 189 of winch drums 188. The winch drums 188 may be actuated by a spring drive 187, which maintains the cables 189 in a taut state.

The suction nozzle 152 is pivotable about a horizontal axis 200 with respect to the ladder 199, since a stub 201 is arranged in a ring 202 of the ladder 199 between a stop 203 rigidly secured to the stub and a buffer 204. The suction nozzle 152 bears on the ground 24 via a roller 205 at the end of a cantilever 206, which is pivotable with respect to the suction nozzle 152 and which is remote-controlled by means of a hydraulic cylinder 207 in dependence upon the comparison between the measuring elements 177 and 31 and in dependence upon the cable-length meter 191.

As shown in FIG. 9 two relatively spaced supporting rollers 208 instead of only one supporting roller 205 are arranged on the cantilever 206.

The propelling dredger 353 of FIG. 10 comprises a suction nozzle 352 pivotally connected with a ladder 399 so as to be pivotable about a standing axis 398 through a hinge 397 and via buffer means formed by two hydro-pneumatic cylinders 396, which are rigidly fastened to the ladder 399. The pistons 395 of said cylinders 396 are connected through the lever 394 with the vertical pivot pin 393 of the suction nozzle 352, which is, moreover, pivotable with respect to said pivot pin 393 about a horizontal hinge 390. Broken lines indicate the position of the suction nozzle 352' when the roller 389 gets into a pothole 388 and the cylinder 387 is set for lifting the suction nozzle 352' to the prescribed level with respect to the roller 389 in dependence upon a wire-length meter 104 and on a level comparison between the measuring elements 55 and 31.

The level setting according to the invention is particularly suitable for use below the water surface for adjusting ground removing tools and also for ground levelling tools and even for ground depositing tools.

Figure 12:
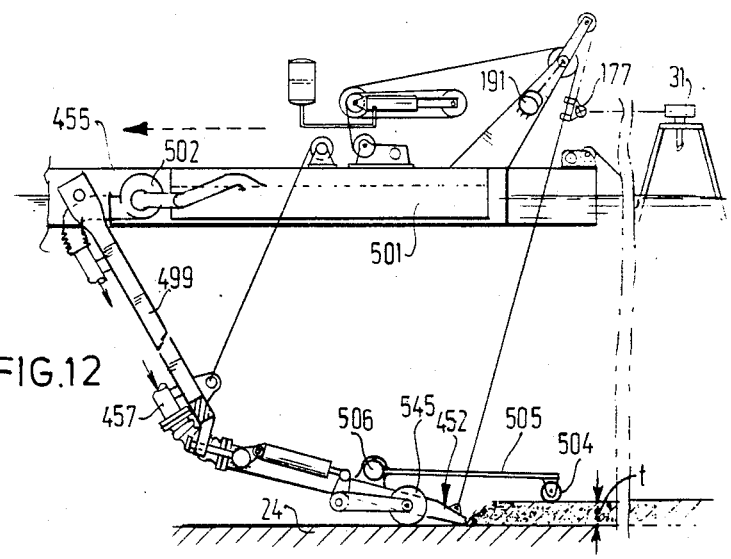

FIG. 12 shows a tool 452 in the form of a broad nozzle supplying a mixture of sand and water from a hold 501 of a floating body 455, through a pump 502 and a pipe 457 connected with a ladder 499. The tool is supported on the ground 24 by means of a supporting member formed by a roller 545 as shown in FIG. 5 and the level setting is identical to that illustrated in FIG. 5. The layer thickness t of the supplied sand is, however, measured by means of a measuring roller 504, which is connected with an arm 505, the angular displacement of which, with respect to the nozzle 452 is measured by means of a goniometer 506 so that the amount of sand supplied per unit time, for example, the sand concentration in the supplied sand-water mixture or the shifting speed, can be varied. This concentration will be raised and/or this shifting speed will be reduced when, on the basis of a comparison between the measuring elements 177 and 31 and on the basis of the wire-length meter 191 and the goniometer 506, it is assessed that the roller 504 is too low and a sand layer exceeding the thickness t has to be deposited.

What we claim is:

1. The method of controlling an underwater tool in a body of water which is affected by waves and tides, so as to provide a specified contour of subaqueous soil, which comprises the steps of:
    (a) establishing a fixed reference point of known level in horizontally spaced relation to the hull;
    (b) positioning said tool in working engagement position with the subaqueous soil below the hull at a working position level which is fixed with respect to said fixed reference point while said hull is at one end of said path, tensioning from said hull a cable connected to said tool while maintaining said tool suspended from said hull at said working position level to compensate for wave motion acting vertically on the hull whereby said cable tends to remain relatively stationary in the vertical sense with respect to said fixed reference point, and establishing a tool level reference point on said cable at a known distance above said tool; and
    (c) controlling said tool, while said hull is travelled toward the opposite end of said path, to form said specified contour by directly monitoring said tool level reference point from said fixed reference point.

2. A device for controlling an underwater tool in a body of water which is affected by waves and tides, to provide a specified contour of subaqueous soil which comprises in combination:
    (a) a buoyant hull adapted to travel along a predetermined path in the body of water;
    (b) tool means suspended from said hull for working the subaqueous soil below said hull as said hull is travelled along said path;
    (c) means for defining a fixed reference point at a known level in horizontally spaced relation to said hull;
    (d) tool level positioning means connected to said tool means and carried by said hull for positioning said tool in working engagement with the subaqueous soil below the hull at a working position level and including wave compensating means for maintaining said tool means at said working position level independent of wave motion acting vertically on said hull;
    (e) tool level reference means attached to said tool for establishing a tool level reference point visible from said fixed reference point at a known distance above said tool;
    (f) measuring means at said fixed reference point for directly monitoring the level of said tool level reference means with respect to said fixed reference point while said hull is travelled along said predetermined path; and
    (g) control means for controlling the level of said tool means in accord with the monitored level of said tool level reference means to form said specified contour;

said measuring means comprising a goniometer for measuring the angle between said tool level reference means and the horizon, said tool level positioning means including a cable connected to said tool and through said wave compensating means to said hull, and said tool level reference means being positioned on said cable.

* * * * *